US010652699B1

(12) United States Patent
Poer et al.

(10) Patent No.: US 10,652,699 B1
(45) Date of Patent: May 12, 2020

(54) METHOD AND DEVICE FOR RANKING AND GEOGRAPHICALLY GROUPING INBUILDING SECTORS

(71) Applicant: Verizon Patent and Licensing Inc., Arlington, VA (US)

(72) Inventors: Derrick Shane Poer, Fort Worth, TX (US); Gunjan Thakkar, McKinney, TX (US); Fahad Khan, McKinney, TX (US)

(73) Assignee: Verizion Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/425,080

(22) Filed: May 29, 2019

(51) Int. Cl.
| | | |
|---|---|---|
| *H04W 24/00* | (2009.01) | |
| *H04W 4/029* | (2018.01) | |
| *H04B 17/318* | (2015.01) | |
| *H04W 24/02* | (2009.01) | |
| *H04W 64/00* | (2009.01) | |
| *H04W 4/021* | (2018.01) | |

(52) U.S. Cl.
CPC .......... *H04W 4/029* (2018.02); *H04B 17/318* (2015.01); *H04W 4/021* (2013.01); *H04W 24/02* (2013.01); *H04W 64/003* (2013.01)

(58) Field of Classification Search
CPC ..... H04W 16/14; H04W 36/30; H04W 28/08; H04W 16/10; H04W 16/18; H04W 28/00; H04W 28/02; H04W 84/18
See application file for complete search history.

(56) References Cited

U.S. PATENT DOCUMENTS

| | | | | |
|---|---|---|---|---|
| 2008/0132257 A1* | 6/2008 | Fok | .......................... | H04L 43/00 455/466 |
| 2010/0284303 A1* | 11/2010 | Catovic | .................. | H04W 24/02 370/254 |
| 2014/0355484 A1* | 12/2014 | Foster | .................... | H04W 24/02 370/255 |
| 2015/0289149 A1* | 10/2015 | Ouyang | ................. | H04W 24/02 370/252 |
| 2016/0165462 A1* | 6/2016 | Tan | ........................ | H04W 24/02 370/254 |
| 2016/0165472 A1* | 6/2016 | Gopalakrishnan | .... | H04W 24/10 455/67.11 |

* cited by examiner

*Primary Examiner* — Khalid W Shaheed

(57) ABSTRACT

A system may receive geographic data including analytics information relating to a geographic region of a network; receive user equipment data including analytics information relating to one or more user equipment of the network; receive node data including analytics information corresponding to one or more nodes of the network; and associate the user equipment data and the node data with the geographic data; identify a coverage index for the geographic region based on the geographic data and the associated user equipment data. The system may identify a capacity index for the geographic region based on the geographic data and the associated node data; determine a regional score for the geographic region based on the coverage index and the capacity index; generate a recommendation to service the geographic region based on the regional score; and perform an action based on the recommendation.

20 Claims, 8 Drawing Sheets

METHOD AND DEVICE FOR RANKING AND GEOGRAPHICALLY GROUPING INBUILDING SECTORS

BACKGROUND

An inbuilding system is a telecommunications solution commonly used to extend and distribute a cellular signal of a mobile network operator within a building. More particularly, an inbuilding system enables mobile devices or other user equipment to connect to a macro network that may be otherwise inaccessible within large buildings, high-rise buildings, and/or the like. In general, an inbuilding system connects to a macro network via a signal source operated by a network service provider, and transmits cellular signals between the signal source and user equipment located within the building via an arrangement of cables, optical fibers, and/or inbuilding antennas located throughout the building.

DETAILED DESCRIPTION OF PREFERRED EMBODIMENTS

Figure 1A:
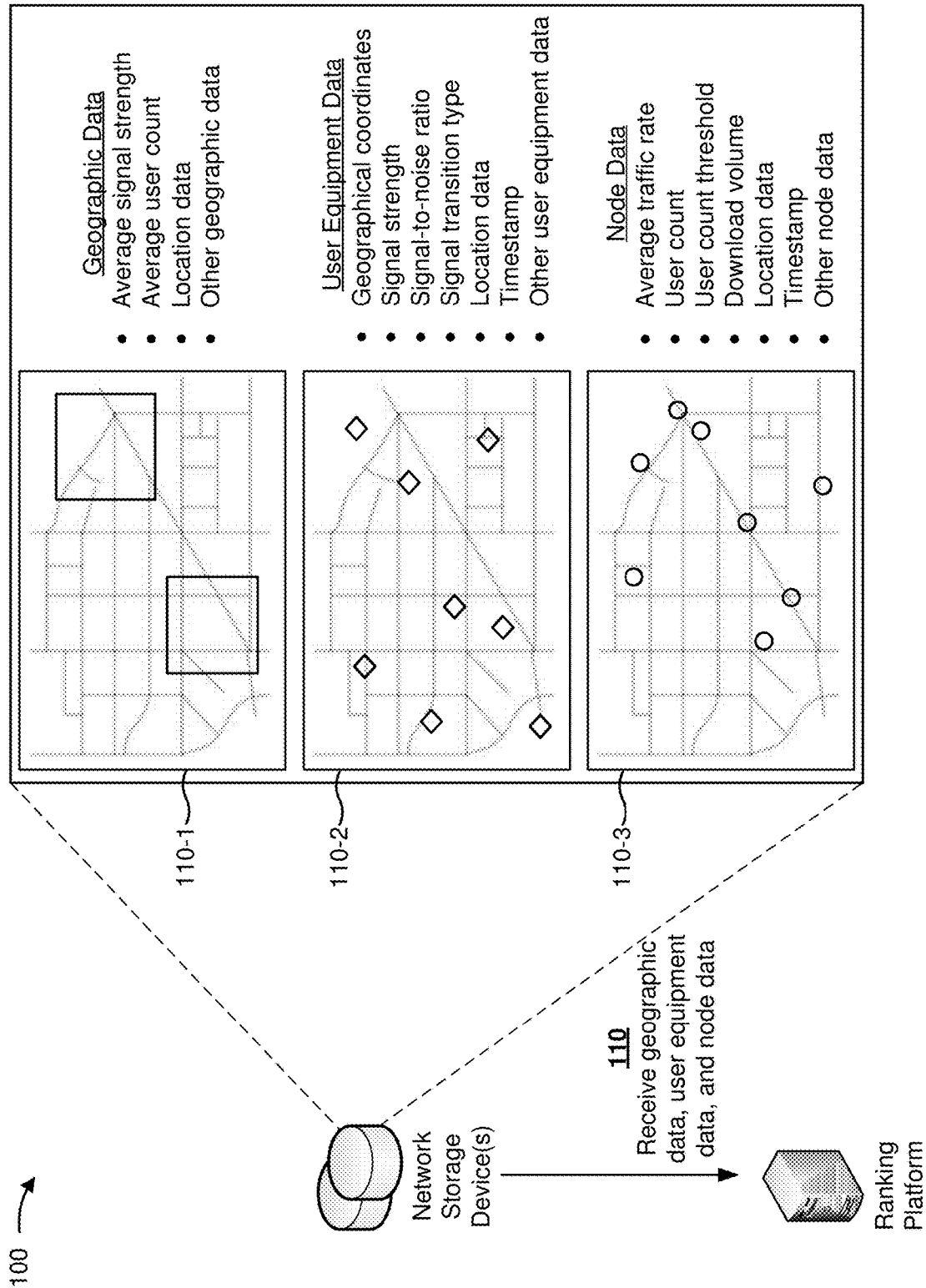
FIGS. 1A-1E are diagrams of one or more example implementations described herein.

The following detailed description of example implementations refers to the accompanying drawings. The same reference numbers in different drawings may identify the same or similar elements.

As the reliance on wireless communications becomes more widespread and as the amount of network traffic continues to increase, mobile network operators pay closer attention to network usage to ensure associated network infrastructure can support the growing demand. Mobile network operators may monitor network usage using network analytics data pertaining to network equipment at a network site or a node, user equipment connecting to the node, and/or the like. Among other factors, mobile network operators may use the network analytics data to assess trends in network coverage and network capacity. Network coverage may be identified based on a coverage index (e.g., a key performance indicator (KPI) related to a signal strength observed by user equipment connected to the network, a signal strength observed by a node connected to the network, and/or another factor relating to network coverage). Network capacity may be identified based on a capacity index (e.g., a KPI related to a number of user equipment attempting to connect to a node, an upper threshold number of user equipment rated for the node, and/or another factor relating to network capacity).

In some cases, mobile network operators may use network analytics data to identify one or more geographic regions and/or one or more inbuilding nodes that are in need of infrastructure support (e.g., build, modification, and/or update to an inbuilding node). With limited resources to account for an abundance of inbuilding nodes in a particular geographic area, mobile network operators may need to prioritize certain geographic regions and/or inbuilding nodes based on a degree of need before deploying infrastructure support. However, quantifying the degree of need in a manner that is systematic and consistent across other inbuilding nodes within a geographic area may be challenging. Furthermore, the diversity of network analytics data obtained from different inbuilding nodes makes it difficult to assess both coverage and capacity needs consistently across the inbuilding nodes. Efforts to prioritize inbuilding nodes often produce coverage-biased or capacity-biased assessments, which can be misleading. As a result, inbuilding nodes having the greatest needs are often left undiscovered or otherwise untreated, further resulting in reduced bandwidth, slower connections, signal losses, and/or other adverse effects.

Some implementations described herein provide a ranking platform that assists mobile network operators in prioritizing geographic regions and/or inbuilding nodes in a manner that is consistent, systematic, and considers both coverage and capacity needs. The ranking platform may receive geographic data, user equipment data, and node data, associate the user equipment data and the node data with the geographic data, and identify a coverage index and a capacity index for a geographic region based on the geographic data, the user equipment data, and the node data. Based on the coverage index and the capacity index, the ranking platform may determine a regional score for the geographic region, determine node scores for inbuilding nodes within the geographic region, generate a recommendation based on the regional score and/or the node scores, and perform an action based on the recommendation. In some implementations, the ranking platform may provide a map of one or more geographic regions with graphical representations of the respective regional scores. In some implementations, the ranking platform may provide a list ranking one or more nodes based on the respective node scores.

In this way, the ranking platform is able to help mobile network operators quickly and easily identify problem areas within a network and prioritize tasks to modify or build network infrastructure in a manner that is consistent, effective, and efficient. The ranking platform leverages real-time network analytics data from a variety of sources and simultaneously compares multiple geographic regions and multiple inbuilding nodes within a particular geographic area and/or within a particular network. The ranking platform thereby significantly reduces the time and resources spent by mobile network operators to individually assess each geographic region and/or inbuilding node. In addition, the ranking platform automatically parses and categorizes the real-time data into coverage indexes and capacity indexes and assigns adjustable weights to the coverage indexes and capacity indexes. This allows mobile network operators flexibility in prioritizing geographic regions and/or inbuilding nodes in terms of coverage needs, capacity needs, or a combination of coverage and capacity needs.

Furthermore, the ranking platform enables mobile network operators to promptly service and deploy infrastructure solutions to inbuilding nodes with the most need of support. Additionally, or alternatively, the ranking platform enables mobile network operators to easily identify coverage gap areas or areas where new infrastructure may help alleviate coverage and/or capacity issues. By allowing mobile network operators to promptly address inbuilding nodes in need, the ranking platform helps maintain network equipment in optimal working condition and allows user equipment to stay connected to faster or preferred networks. Moreover, end user devices experience fewer signal degradations, fewer signal losses, less latency, and overall better connection quality. The ranking platform automates steps involved in studying network analytics data, sorting the network analytics data, and comparing geographic regions and/or inbuilding nodes and, thereby, conserves computational and network resources (e.g., processing resources, memory resources, power resources, communication resources, and/or the like) that may otherwise be used to prioritize geographic regions and/or inbuilding nodes in a less efficient manner.

FIGS. 1A-1E are diagrams of one or more example implementations 100 described herein. As shown in FIGS. 1A-1E, the example implementation(s) 100 may include a ranking platform, a network storage device, a client device, and network equipment. FIGS. 1A-1E present one or more functions that may be performed by the ranking platform to provide a network planning service. For example, the ranking platform may receive network analytics data, identify a coverage index and a capacity index for a geographic region (e.g., a geo-bin) and/or a node based on the network analytics data, determine a regional score and/or a node score based on the coverage index and the capacity index, generate a recommendation to service the geographic region and/or the node based on the regional score and/or a node score, and perform an action based on the recommendation. In some implementations, one or more of the functions, described as being performed by the ranking platform, may be performed by another device, such as the network storage device, the client device, the network equipment, and/or the like.

In some implementations, the ranking platform may be used in association with a network planning service that is supported by the network storage device. For example, the network planning service may provide a ranking feature (e.g., ranking nodes based on network analytics data), a geo-binning feature (e.g., grouping nodes based on geographic regions), and/or another feature relating to planning or prioritizing infrastructure deployment for nodes. In some implementations, the network planning service may be used by one or more subscribers (e.g., a mobile network operator, a carrier, an end user of a mobile network, and/or the like) to identify inbuilding nodes with coverage needs and/or capacity needs, to locate geographic regions with coverage needs and/or capacity needs, to determine coverage needs and/or capacity needs of a particular geographic region and/or an inbuilding node, and/or the like. A subscriber may access the network planning service using a client device (e.g., a computer, a smart phone, a mobile device, and/or the like) that is connected to the ranking platform over a wired connection and/or a wireless connection.

As shown in FIG. 1A, and by reference number 110, the ranking platform may receive geographic data 110-1, user equipment data 110-2, and/or node data 110-3 from one or more network storage devices. Geographic data 110-1 may include network analytics data relating to a geographic region (e.g., a 50 m×50 m square, a 100 m×100 m square, a 200 m×200 m square, and/or the like) within a particular network (e.g., a 2G network, a 3G network, a 4G network, a long-term evolution (LTE) network, a 5G network, a new radio (NR) network, and/or the like). For example, geographic data 110-1 may include a KPI corresponding to one or more network connections established with one or more user equipment (e.g., computers, smart phones, mobile devices, and/or other user devices) and/or one or more nodes (e.g., access points, routers, modems, switches, base stations, gateways, and/or other network equipment) located within the geographic region. As shown for the example in FIG. 1A, the geographic region may be defined by a square (e.g., a 50 m×50 m square, a 100 m×100 m square, a 200 m×200 m square, and/or the like). In some implementations, the geographic region may be defined using another polygon or shape having different dimensions.

In some implementations, geographic data 110-1 may include an average of network analytics data received during a particular timeframe (e.g., one or more hours, one or more weeks, one or more months, and/or the like), location information (e.g., geographical coordinates corresponding to the individual user equipment, nodes, and/or boundaries of the geographic region), and/or the like. In some implementations, geographic data 110-1 may include real-time network analytics data received from user equipment and/or nodes, and/or KPI derived based on real-time network analytics data. For example, geographic data 110-1 may include an average user count (e.g., an average number of distinct user equipment and/or nodes located within the geographic region and connected to the network), an average signal strength (e.g., an average of the signal strength observed by connected user equipment and/or nodes), a number of connection attempts, a number of established connections, and/or another KPI. In some examples, geographic data 110-1 may be specific to inbuilding user equipment and/or inbuilding nodes, or otherwise distinguish network analytics data received from inbuilding user equipment and/or inbuilding nodes.

In some implementations, user equipment data 110-2 may include network analytics data relating to one or more user equipment connected to the network. User equipment data 110-2 may include one or more KPIs corresponding to individual network connections established with a computer, a smart phone, a mobile device, an Internet-of-Things (IoT) device, and/or another user device. For example, user equipment data 110-2 may include a signal strength, a signal-to-noise ratio, a signal loss, a signal transition type (e.g., a transition between a 2G network, a 3G network, a 4G network, an LTE network, a 5G network, and/or the like), a corresponding location of the user equipment (e.g., geographical coordinates of the user equipment), a corresponding timestamp, and/or the like. In some examples, user equipment data 110-2 may include a user count (e.g., a number of distinct user equipment connected via the network), a number of connection attempts, a number of reestablishment attempts, a reference signal received power (RSRP) (e.g., an average power received by user equipment), a reference signal received quality (RSRQ) (e.g., a quality index of a signal received by the user equipment), and/or the like.

In some implementations, user equipment data 110-2 may include real-time network analytics data and/or an average of real-time network analytics data received from user equipment during a particular timeframe (e.g., one or more hours, one or more weeks, one or more months, and/or the like). In some examples, user equipment data 110-2 may be specific to inbuilding user equipment, or otherwise distinguish between network analytics data received from inbuilding user equipment and network analytics data received from other user equipment. Network analytics data received from inbuilding user equipment may be distinguished from network analytics data received from other user equipment based on a download volume, a network connection type, a node via which the user equipment connects to the network, a signal loss, a signal transition pattern, and/or the like. In some implementations, network analytics data from inbuilding user equipment may be distinguished from network analytics data received from other user equipment based on a location of the user equipment (e.g., based on geographical coordinates of the user equipment relative to known geographical coordinates of a building structure) and/or based on an observed pattern of movement of the user equipment.

In some implementations, node data 110-3 may include network analytics data relating to one or more nodes of the network. For example, node data 110-3 may include one or more KPIs corresponding to a user count (e.g., a number of distinct user equipment connected via an inbuilding node), a user count threshold (e.g., a number of connections the inbuilding node is rated to support), a trigger event (e.g., an event corresponding to when the user count satisfies the user count threshold and/or the like), an average rate of network traffic, a download volume, a corresponding location of the inbuilding node (e.g., geographical coordinates of the inbuilding node, associated building, and/or the like), a corresponding timestamp, and/or the like. In some implementations, node data 110-3 may include real-time network analytics data and/or an average of real-time network analytics data received from an inbuilding node during a particular timeframe (e.g., one or more hours, one or more weeks, one or more months, and/or the like). In some examples, node data 110-3 may be specific to an inbuilding node, or otherwise distinguish between network analytics data received from an inbuilding node and network analytics data received from other nodes.

Figure 1B:
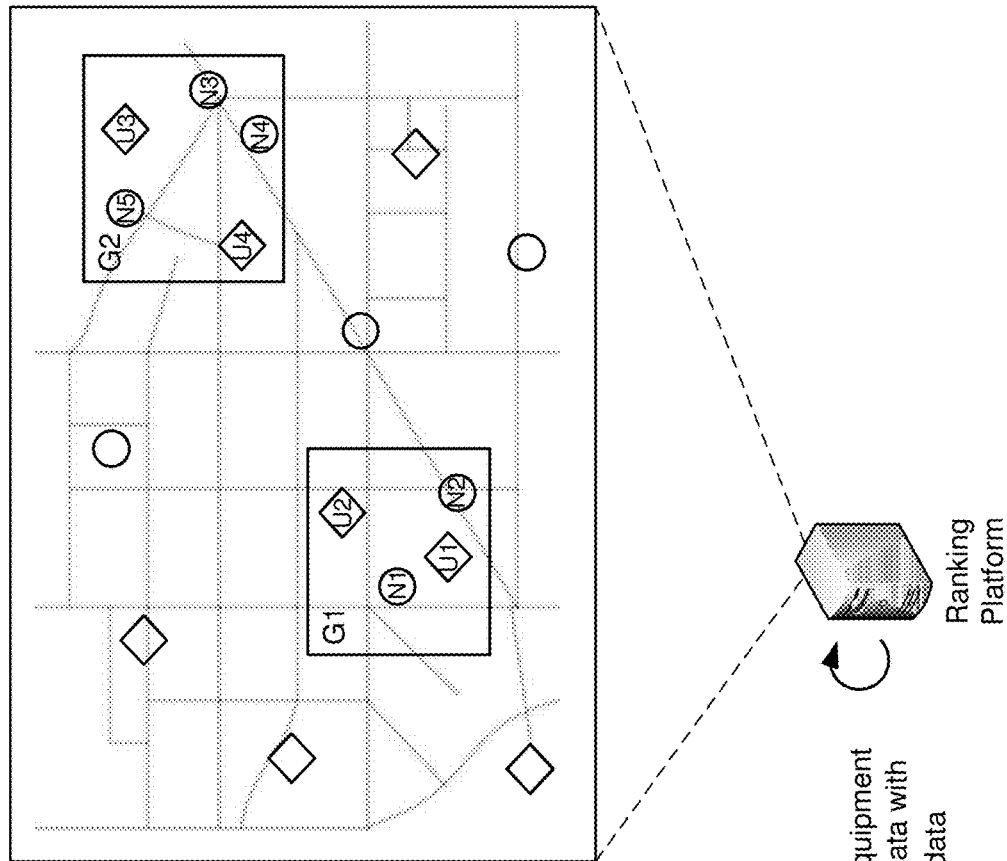

As shown in FIG. 1B, and by reference number 120, the ranking platform may associate user equipment data 110-2 and node data 110-3 with geographic data 110-1 based on the respective locations of the one or more user equipment, the one or more inbuilding nodes, and the geographic region associated with geographic data 110-1. The ranking platform may use location information (e.g., geographical coordinates and/or the like) associated with user equipment data 110-2 and the geographic region (e.g., Geographic Region G1 of FIG. 1B) to identify user equipment (e.g., User Equipment U1 and U2 of FIG. 1B) located within the geographic region. The ranking platform may use location information (e.g., geographical coordinates and/or the like) associated with node data 110-3 and the geographic region (e.g., Geographic Region G1 of FIG. 1B) to identify inbuilding nodes (e.g., Nodes N1 and N2 of FIG. 1B) located within the geographic region. In some examples, such as when an inbuilding node corresponds to fixed or static network equipment, the ranking platform may associate node data 110-3 with geographic data 110-1 based on a prior designation.

Figure 1C:
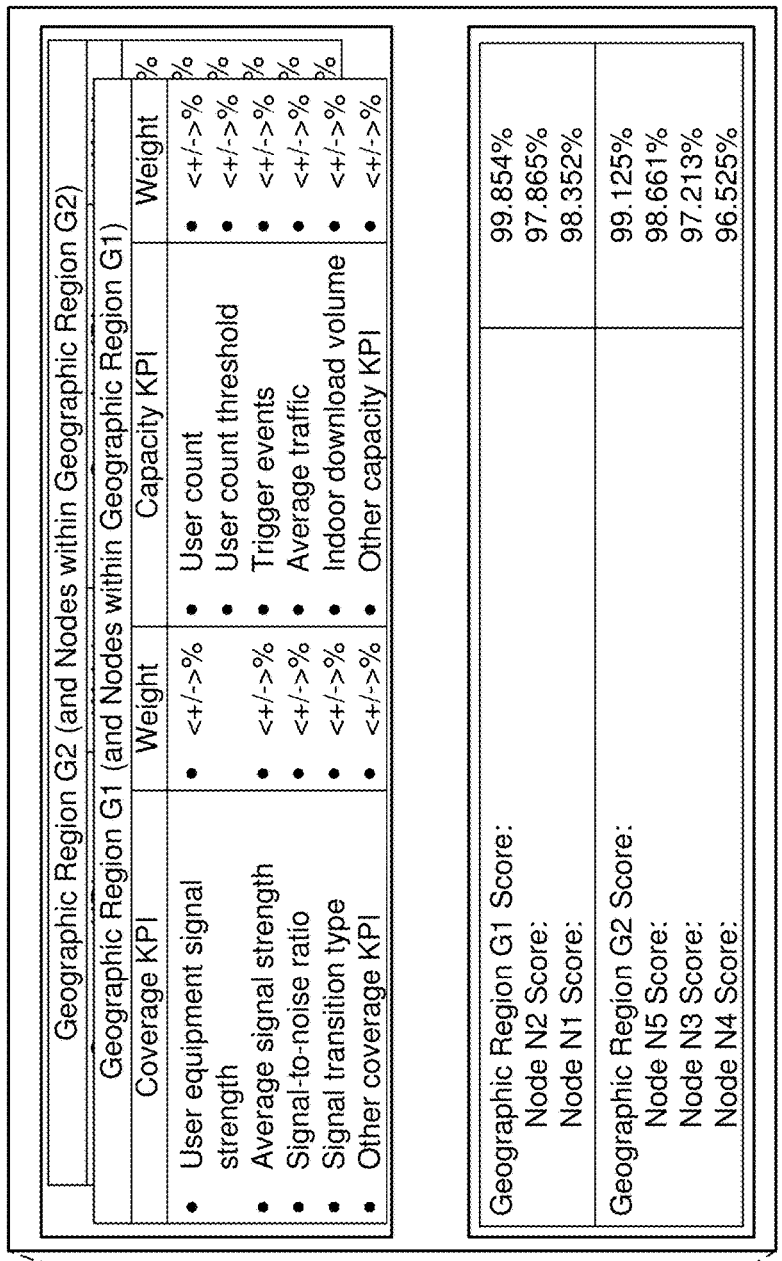

As shown in FIG. 1C, and by reference number 130, the ranking platform may identify a coverage index and a capacity index for the geographic region and/or for one or more of the inbuilding nodes associated with the geographic region. A coverage index may include a KPI that is indicative of network availability in different locations throughout the geographic region. The ranking platform may determine the coverage index based on KPI derived from geographic data 110-1 and/or user equipment data 110-2. Additionally, or alternatively, the ranking platform may determine the coverage index based on KPI derived from node data 110-3. As shown for the example in FIG. 1C, the coverage index may include a signal strength observed by individual user equipment, an average of signal strength observed by individual user equipment and/or an inbuilding node within the geographic region, a signal-to-noise ratio of a network signal, a signal transition type (e.g., a transition between a 2G network, a 3G network, a 4G network, an LTE network, a 5G network, and/or the like) observed by individual user equipment, and/or another coverage index relating to the geographic region and/or an associated inbuilding node. The coverage index may be specific to the geographic region and/or specific to individual inbuilding nodes.

In some implementations, a capacity index may include a KPI that is indicative of the ability of the geographic region and/or one or more associated inbuilding nodes to support multiple network connections. The ranking platform may determine the capacity index based on KPI derived from geographic data 110-1 and/or node data 110-3. Additionally, or alternatively, the ranking platform may determine the capacity index based on KPI derived from user equipment data 110-2. As shown for the example in FIG. 1C, the capacity index may include a user count (e.g., an average number of distinct user equipment connected via an inbuilding node within the geographic region), a user count threshold (e.g., a number of connections an inbuilding node is rated to support), a trigger event (e.g., an event corresponding to when the user count satisfies the user count threshold and/or the like), a frequency of trigger events observed by an inbuilding node, a rate of network traffic through an inbuilding node, a download volume via an inbuilding node, and/or another capacity index relating to the geographic region and/or an associated inbuilding node. The capacity index may be specific to the geographic region and/or specific to individual inbuilding nodes.

In some implementations, the ranking platform may assign a respective weight to each of the coverage index and the capacity index, and determine a weighted coverage index and a weighted capacity index. The weight (e.g., a percentage value, a ratio, a fraction, a multiplier, and/or the like) may be assigned according to the type of prioritization to perform (e.g., based on coverage needs, based on capacity needs, or based on both coverage and capacity needs). For example, a coverage-biased prioritization may assign a majority weight to a coverage KPI and a minority weight to a capacity KPI, a capacity-biased prioritization may assign a minority weight to a coverage KPI and a majority weight to a capacity KPI, and a balanced prioritization may assign an equal weight to each of a coverage KPI and a capacity KPI. In some implementations, a plurality of coverage indexes and a plurality of capacity indexes may be identified. As shown for the example in FIG. 1C, the ranking platform may assign a respective weight to each of the coverage indexes and the capacity indexes. In some examples, one or more of the weights may be adjustable by a user (e.g., a mobile network operator, a carrier, an end user of a mobile network, and/or another subscriber) using a client device.

As further shown in FIG. 1C, and by reference number 140, the ranking platform may determine a regional score for the geographic region and/or a node score for each associated inbuilding node based on the weighted coverage index and the weighted capacity index. The ranking platform may determine the regional score for the geographic region using a calculation based on the weighted coverage indexes and the weighted capacity indexes pertaining to the geographic region (e.g., a sum of the indexes or another calculation based on the indexes). The ranking platform may determine the node score of an inbuilding node within the geographic region using a calculation based on the weighted coverage indexes and the weighted capacity indexes specific to the inbuilding node (e.g., a sum of the indexes or another calculation based on the indexes). As shown for the example in FIG. 1C, the ranking platform may determine a respective regional score for each of a plurality of geographic regions (e.g., Geographic Regions G1 and G2) supported by the network. Additionally, or alternatively, the ranking platform may determine a respective node score for each of a plurality of inbuilding nodes (e.g., Nodes N1-N5) associated with the geographic regions and supported by the network.

Figure 1D:
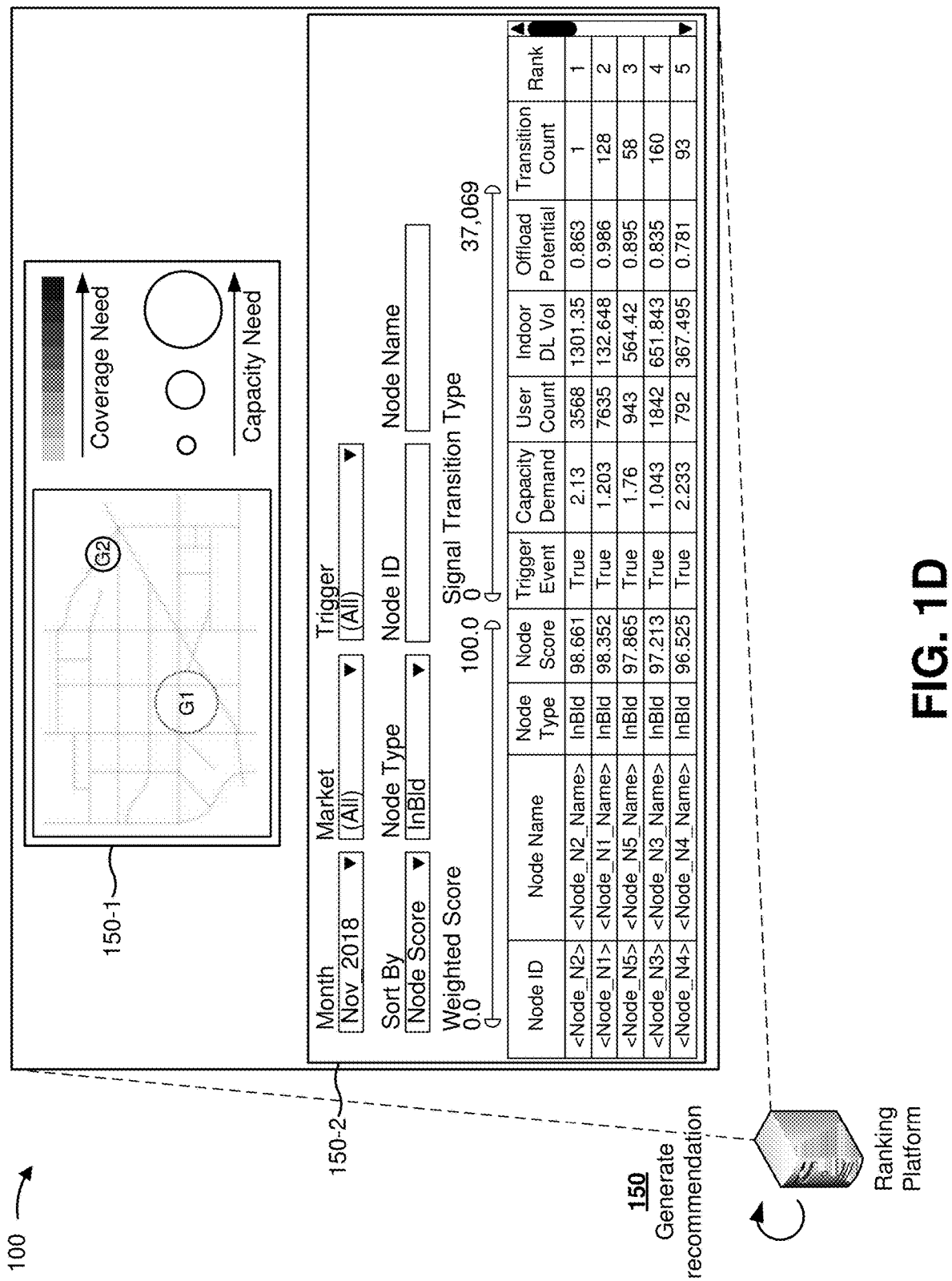

As shown in FIG. 1D, and by reference number 150, the ranking platform may generate a recommendation to service a geographic region based on a respective regional score, and/or generate a recommendation to service an inbuilding node based on a respective node score. The recommendation to service a geographic region may be generated in the form of a map (e.g., map 150-1 of FIG. 1D) of a geographic area supported by the network. The map may include a graphical representation of the geographic region (e.g., shown as a circle in FIG. 1D) that is centered and overlaid at a location on the map corresponding to the geographic region. In some implementations, the graphical representation may provide an indication of a need for coverage support and/or a need for capacity support of the geographic region (e.g., as determined based on the weighted coverage index and the weighted capacity index for the geographic region). As shown for example in FIG. 1D, the graphical representation may be color-coded according to a coverage need (e.g., using a darker color to indicate a greater need for coverage support) and sized according to a capacity need (e.g., using a larger circle to indicate a greater need for capacity support). Using color-coding and sizing are merely given as examples of how the coverage need and the capacity need can be represented.

In some implementations, the map may be configurable to include other graphical representations. For example, the map may include one or more graphical representations of inbuilding nodes located within and/or outside of the geographic region, other types of nodes located within and/or outside of the geographic region, user equipment located within and/or outside of the geographic region, and/or the like. In some examples, the map may be interactive and configured to receive input from a user via a user interface of a client device. For example, the map may enable a user to select a geographic region displayed on the map, display locations of one or more inbuilding nodes located within the geographic region, display node scores for the one or more inbuilding nodes located within the geographic region, display information relating to network equipment associated with the one or more inbuilding nodes, and/or display other information related to the geographic region and/or the associated inbuilding nodes. In some examples, the map may be updated periodically or continuously in real-time. Additionally, or alternatively, the recommendation to service a geographic region may be generated in the form of a list ranking the geographic region based on the regional score and in comparison with other geographic regions within the network.

In some implementations, the recommendation to service an inbuilding node may be generated in the form of a list (e.g., list 150-2 of FIG. 1D) comparing the inbuilding node with other inbuilding nodes within and/or outside of the geographic region, other types of nodes located within and/or outside of the geographic region, and/or the like. As shown for the example in FIG. 1D, the list may rank the inbuilding nodes (e.g., Nodes N1-N5) based on the node scores (e.g., prioritizing inbuilding nodes with the greatest need for infrastructure support). The list may include one or more parameters used in determining the node scores (e.g., coverage indexes, capacity indexes, and/or other information used to rank the inbuilding nodes). In some examples, the list may be interactive and configured to receive input from a user via a user interface of a client device. For instance, the ranking platform may enable a user to sort and/or filter the list based on other criteria (e.g., a coverage index, a capacity index, a service market, a trigger type, a node identification number, a node name, a node location, a node type, a timeframe associated with the network analytics data, and/or the like). In some examples, the ranking platform may enable a user to query a specific inbuilding node (e.g., by a node identification number, a node name, a node location, a node type, and/or the like). In some examples, the list may be updated periodically or continuously in real-time. Additionally, or alternatively, the recommendation to service an inbuilding node may be generated in the form of a map of a geographic area supported by the network.

Figure 1E:
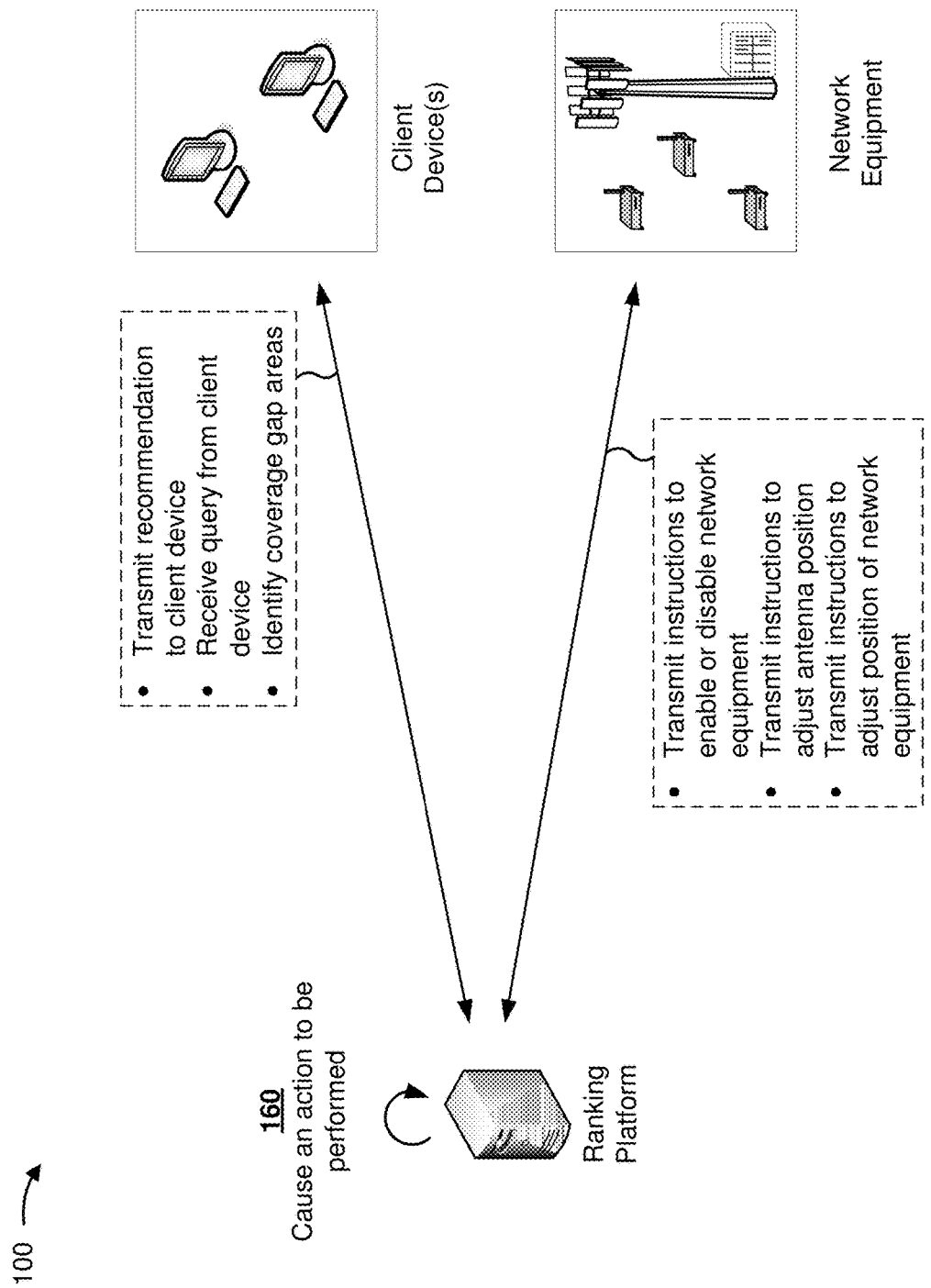

As shown in FIG. 1E, and by reference number 160, the ranking platform may cause an action to be performed based on the recommendation. For example, the ranking platform may transmit the recommendation (e.g., a map ranking geographic regions in need of support and/or a list ranking inbuilding nodes in need of support) to a user via a client device. In some implementations, the ranking platform may automatically identify the highest ranked geographic region and/or the highest ranked inbuilding node, and transmit a recommendation to the user or dispatch a technician to service the identified geographic region and/or the identified inbuilding node. In some implementations, the ranking platform may receive a query from a user via the client device (e.g., a request to score, rank, or otherwise determine a level of urgency to service a particular geographic region and/or a particular inbuilding node). The ranking platform may respond to the user with a score and/or a rank of the geographic region and/or the inbuilding node, or otherwise characterize the type of service needed by the geographic region and/or the inbuilding node. In some examples, the recommendation may identify a coverage gap and/or an opportunity for a new infrastructure build within a geographic area. The ranking platform may thereby enable prompt deployment of infrastructure support and maintain optimal network connections for network equipment and connected user equipment.

In some implementations, the ranking platform may transmit instructions to enable or disable network equipment based on the recommendation. For example, if the recommendation indicates an inbuilding node that is at or beyond capacity, the ranking platform may cause other network equipment (e.g., access points, routers, modems, switches, and/or the like) capable of offloading or otherwise supporting the inbuilding node to turn on or boot up. In some examples, the ranking platform may cause certain network equipment to redirect network traffic in a way to improve coverage and/or alleviate capacity of an inbuilding node. In some examples, the ranking platform may transmit instructions to cause a movable antenna (e.g., of a base station, an access point, and/or the like) to change position to improve coverage and/or to alleviate capacity of an inbuilding node. In some examples, the ranking platform may transmit instructions to cause one or more movable network equipment (e.g., aerial access points, mobile base stations, and/or the like) to change position to improve coverage and/or alleviate capacity of an inbuilding node. The ranking platform may thereby distribute network traffic more evenly across available network equipment and maintain optimal network connections for connected user equipment.

In this way, the ranking platform is able to help mobile network operators quickly and easily identify problem areas within a network and prioritize tasks to modify or build network infrastructure in a manner that is consistent, effective, and efficient. The ranking platform leverages real-time network analytics data from a variety of sources and simultaneously compares multiple geographic regions and multiple inbuilding nodes within a particular geographic area and/or within a particular network. The ranking platform thereby significantly reduces the time and resources spent by mobile network operators to individually assess each geographic region and/or inbuilding node. In addition, the ranking platform automatically parses and categorizes the real-time data into coverage indexes and capacity indexes and assigns adjustable weights to the coverage indexes and capacity indexes. This allows mobile network operators flexibility in prioritizing geographic regions and/or inbuilding nodes in terms of coverage needs, capacity needs, or a combination of coverage and capacity needs.

Furthermore, the ranking platform enables mobile network operators to promptly service and deploy infrastructure solutions to inbuilding nodes with the most need of support. Additionally, or alternatively, the ranking platform enables mobile network operators to easily identify coverage gap areas or areas where new infrastructure may help alleviate coverage and/or capacity issues. By allowing mobile network operators to promptly address inbuilding nodes in need, the ranking platform helps maintain network equipment in optimal working condition and allows user equipment to stay connected to faster or preferred networks. Moreover, end user devices experience fewer signal degradations, fewer signal losses, less latency, and overall better connection quality. By providing steps involved in studying network analytics data, sorting the network analytics data, and comparing geographic regions and/or inbuilding nodes, the ranking platform further helps conserve computational and network resources (e.g., processing resources, memory resources, power resources, communication resources, and/ or the like) that may otherwise be used to prioritize geographic regions and/or inbuilding nodes in a less efficient manner.

As indicated above, FIGS. 1A-1E are provided as one or more examples. Other examples can differ from what is described with regard to FIGS. 1A-1E.

Figure 2:
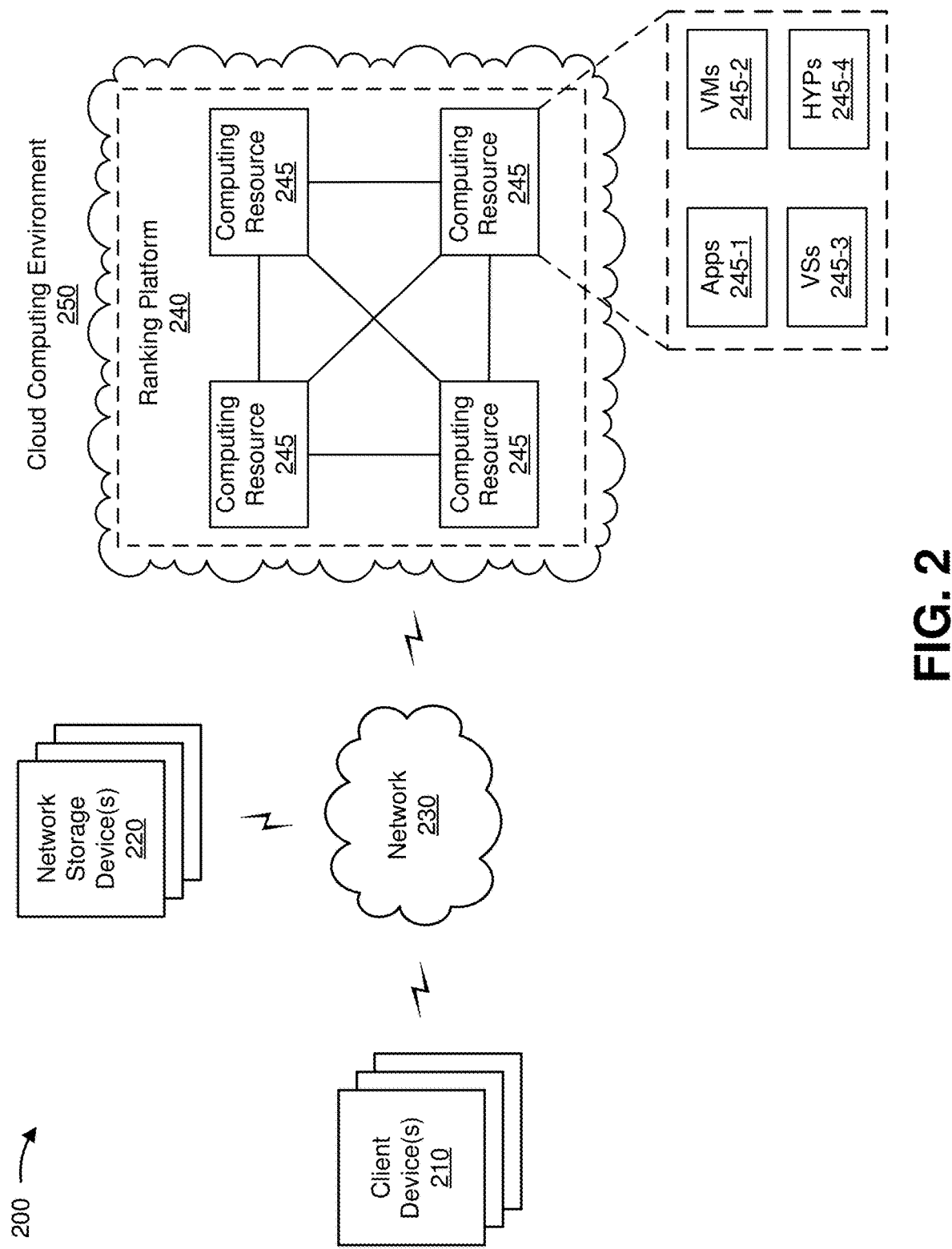
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more client devices 210 (referred to herein individually as client device 210 and collectively as client devices 210), one or more network storage devices 220 (referred to herein individually as network storage device 220 and collectively as network storage devices 220), network 230, ranking platform 240, computing resource 245, and cloud computing environment 250. Devices of environment 200 may interconnect via wired connections, wireless connections, or a combination of wired and wireless connections.

Client device 210 includes one or more devices capable of receiving, generating, storing, processing, and/or providing information associated with prioritizing geographic regions and/or inbuilding nodes for infrastructure deployment. For example, client device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network storage device 220 includes one or more devices capable of storing, processing, and/or routing information. Network storage device 220 may include, for example, a server device, a device that stores a data structure, a device in a cloud computing environment or a data center, a device in a core network of a network operator, a network controller, and/or the like. In some implementations, network storage device 220 may include a communication interface that allows network storage device 220 to receive information from and/or transmit information to other devices in environment 200, such as client device 210, ranking platform 240, and/or the like.

Network 230 includes one or more wired and/or wireless networks. For example, network 230 may include a cellular network (e.g., a long-term evolution (LTE) network, a code division multiple access (CDMA) network, a 2G network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Ranking platform 240 includes one or more computing devices configured to automatically prioritize geographic regions and/or inbuilding nodes based on coverage and capacity needs. In some implementations, ranking platform 240 may receive network analytics data provided by network storage device 220, identify a coverage index and a capacity index for a geographic region and/or an inbuilding node based on the network analytics data, determine a regional score and/or a node score based on the coverage index and the capacity index, generate a recommendation to service the geographic region and/or the inbuilding node based on the regional score and/or a node score, and perform an action based on the recommendation. In some implementations, ranking platform 240 may be designed to be modular such that certain software components may be swapped in or out depending on a particular need. As such, ranking platform 240 may be easily and/or quickly reconfigured for different uses. In some implementations, ranking platform 240 may receive information from and/or transmit information to client device 210, network storage device 220, and/or the like.

In some implementations, ranking platform 240 may include a server device or a group of server devices. In some implementations, ranking platform 240 may be hosted in cloud computing environment 250. Notably, while implementations described herein describe ranking platform 240 as being hosted in cloud computing environment 250, in some implementations, ranking platform 240 may be non-cloud-based or may be partially cloud-based.

Cloud computing environment 250 includes an environment that delivers computing as a service, whereby shared resources, services, and/or the like may be provided to client device 210, network storage device 220, and/or the like. Cloud computing environment 250 may provide computation, software, data access, storage, and/or other services that do not require end-user knowledge of a physical location and configuration of a system and/or a device that delivers the services. As shown, cloud computing environment 250 may include ranking platform 240 and computing resource 245.

Computing resource 245 includes one or more personal computers, workstation computers, server devices, or another type of computation and/or communication device. In some implementations, computing resource 245 may host ranking platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by client device 210. Application 245-1 may eliminate a need to install and execute the software applications on client device 210. For example, application 245-1 may include software associated with ranking platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., client device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
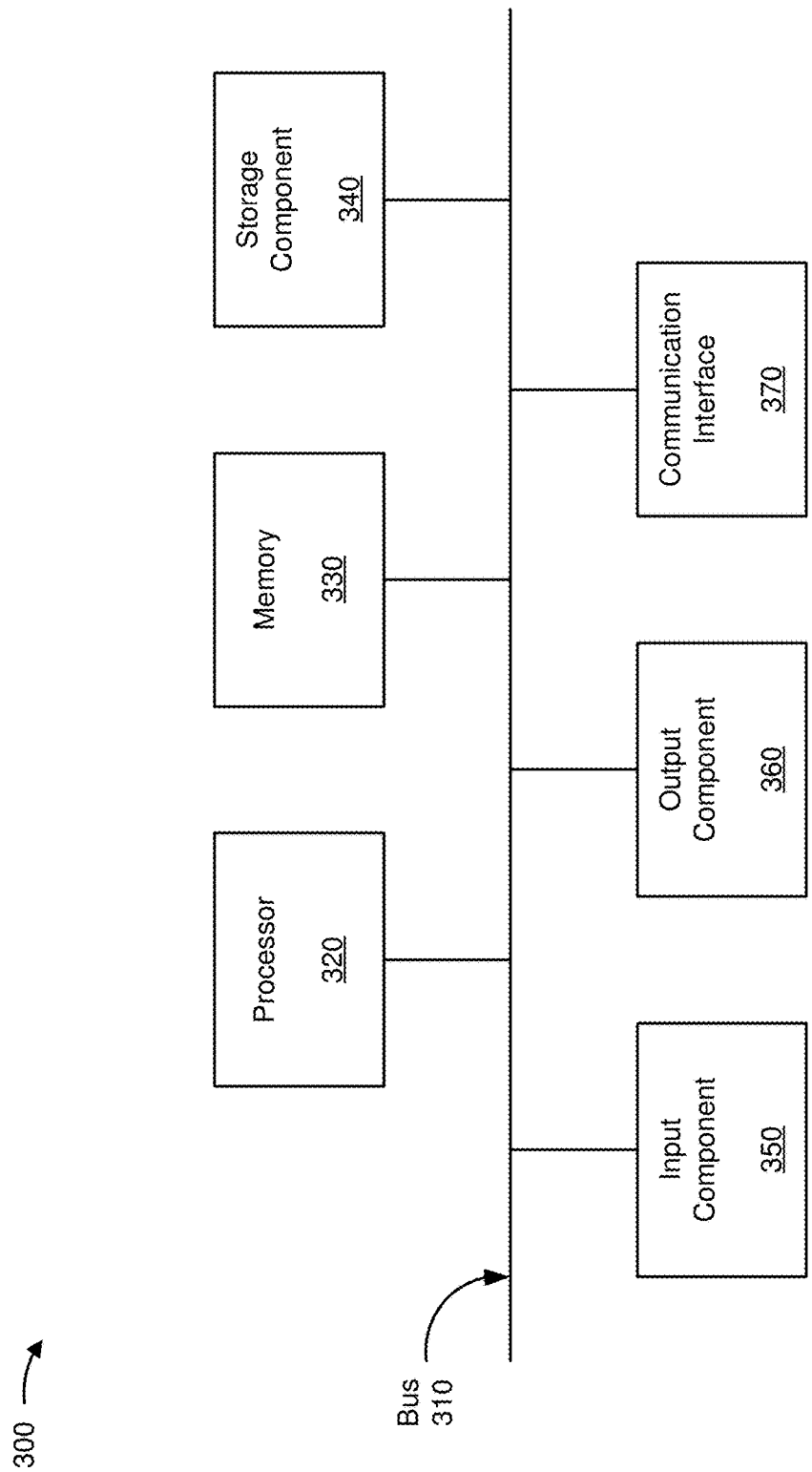
FIG. 3 is a diagram of example components of one or more devices of FIG. 2.

FIG. 3 is a diagram of example components of a device 300. Device 300 may correspond client device 210, network storage device 220, ranking platform 240, and/or computing resource 245. In some implementations, client device 210, network storage device 220, ranking platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
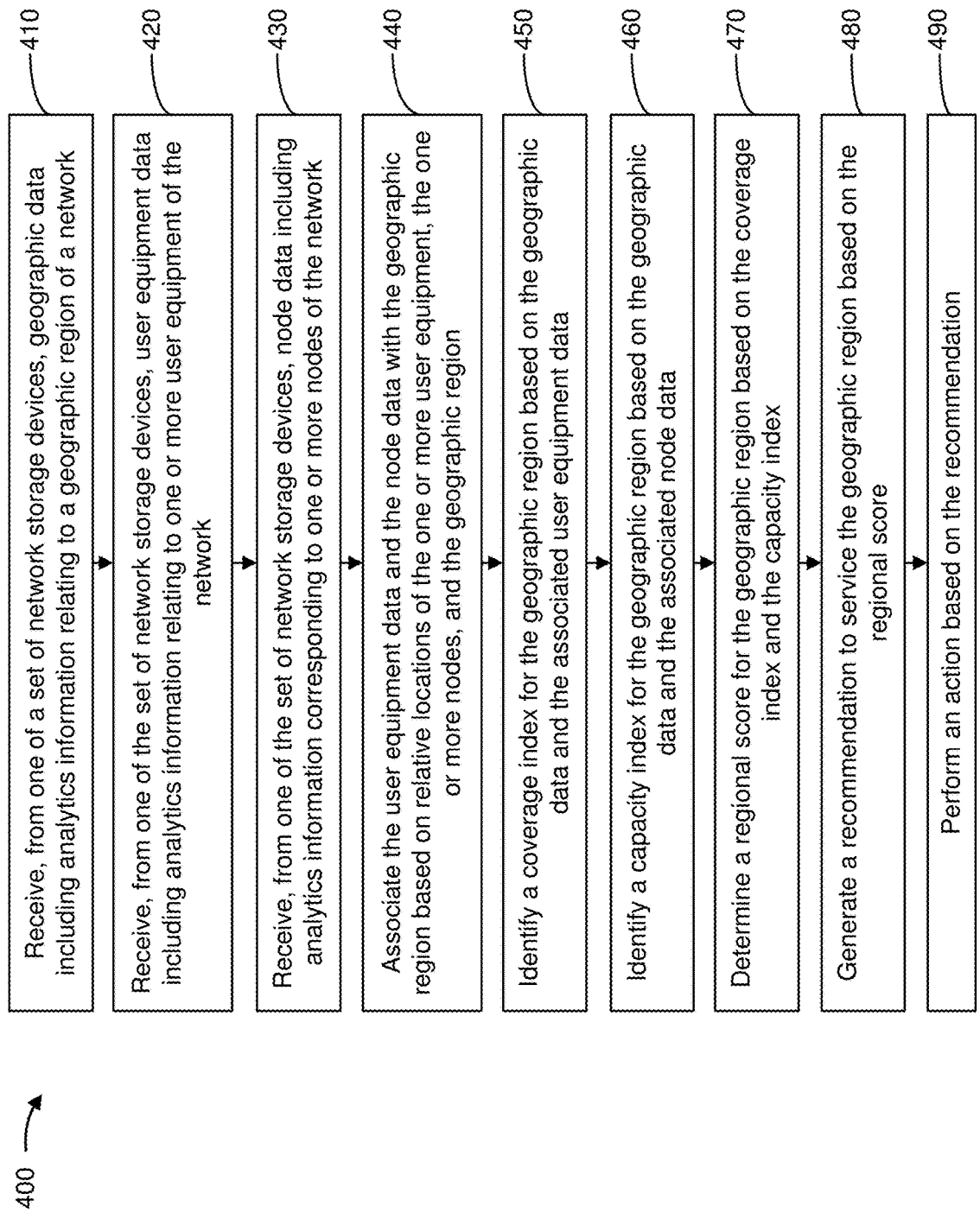
FIG. 4 is a flow chart of an example process for ranking geographic regions and inbuilding nodes.

FIG. 4 is a flow chart of an example process 400 for ranking geographic regions and inbuilding nodes. In some implementations, one or more process blocks of FIG. 4 may be performed by a ranking platform (e.g., ranking platform 240). In some implementations, one or more process blocks of FIG. 4 may be performed by another device or a group of devices separate from or including ranking platform 240, such as a client device (e.g., client device 210), or a network storage device (e.g., network storage device 220).

As shown in FIG. 4, process 400 may include receiving geographic data including analytic information relating to a geographic region of a network (block 410). For example, the ranking platform (e.g., using a computing resource 245, a processor 320, a memory 330, a storage component 340, an input component 350, and a communication interface 370, and/or the like) may receive geographic data including analytic information relating to a geographic region of a network, as described above. The geographic data may include a KPI corresponding to one or more network connections established with one or more user equipment and/or one or more inbuilding nodes located within the geographic region. In some examples, the geographic data may include real-time network analytics data received from user equipment and/or inbuilding nodes, and/or KPI derived based on real-time network analytics data. In some implementations, the geographic data may include an average of network analytics data received during a particular timeframe, location information, and/or the like. For example, the geographic data may include an average user count, an average signal strength, a number of connection attempts, a number of established connections, and/or another KPI.

As shown in FIG. 4, process 400 may include receiving user equipment data including analytics information relating to one or more user equipment of the network (block 420). For example, the ranking platform (e.g., using a computing resource 245, a processor 320, a memory 330, a storage component 340, an input component 350, and a communication interface 370, and/or the like) may receive user equipment data including analytics information relating to one or more user equipment of the network, as described above. The user equipment data may include network analytics data relating to one or more user equipment connected to the network. For example, the user equipment data may include a signal strength, a signal-to-noise ratio, a signal loss, a signal transition type, a corresponding location of the user equipment, a corresponding timestamp, and/or the like. In some examples, the user equipment data may include a user count, a number of connection attempts, a number of reestablishment attempts, a RSRP, a RSRQ, and/or the like. In some implementations, the user equipment data may include real-time network analytics data and/or an average of real-time network analytics data received from user equipment during a particular timeframe.

As shown in FIG. 4, process 400 may include receiving node data including analytics information corresponding to one or more nodes of the network (block 430). For example, the ranking platform (e.g., using a computing resource 245, a processor 320, a memory 330, a storage component 340, an input component 350, and a communication interface 370, and/or the like) may receive node data including analytics information corresponding to one or more nodes of the network, as described above. The node data may include network analytics data relating to one or more inbuilding nodes of the network. In some implementations, the node data may include one or more KPIs corresponding to a user count, a user count threshold, a trigger event, an average rate of network traffic, a download volume, a corresponding location of an inbuilding node, a corresponding timestamp, and/or the like. In some implementations, the node data may include real-time network analytics data and/or an average of real-time network analytics data received from an inbuilding node during a particular timeframe.

As further shown in FIG. 4, process 400 may include associating the user equipment data and the node data with the geographic region based on relative locations of the one or more user equipment, the one or more nodes, and the geographic region (block 440). For example, the ranking platform (e.g., using a computing resource 245, a processor 320, a memory 330, a storage component 340, and/or the like) may associate the user equipment data and the node data with the geographic region based on relative locations of the one or more user equipment, the one or more nodes, and the geographic region, as described above. In some implementations, the ranking platform may use location information associated with the user equipment data and the geographic region to identify user equipment located within the geographic region. In some examples, the ranking platform may use location information associated with the node data and the geographic region to identify inbuilding nodes located within the geographic region.

As further shown in FIG. 4, process 400 may include identifying a coverage index for the geographic region based on the geographic data and the associated user equipment data (block 450). For example, the ranking platform (e.g., using a computing resource 245, a processor 320, a memory 330, a storage component 340, and/or the like) may identify a coverage index for the geographic region based on the geographic data and the associated user equipment data, as described above. The coverage index may include a KPI that is indicative of network availability in different locations throughout the geographic region. The ranking platform may determine the coverage index based on KPI derived from the geographic data and/or the user equipment data. In some implementations, the ranking platform may determine the coverage index based on KPI derived from the node data. The coverage index may include a signal strength observed by individual user equipment, an average of signal strength observed by individual user equipment and/or an inbuilding node within the geographic region, a signal-to-noise ratio of a network signal, a signal transition type from individual user equipment, and/or another coverage index relating to the geographic region and/or an associated inbuilding node.

As further shown in FIG. 4, process 400 may include identifying a capacity index for the geographic region based on the geographic data and the associated node data (block 460). For example, the ranking platform (e.g., using a computing resource 245, a processor 320, a memory 330, a storage component 340, and/or the like) may identify a capacity index for the geographic region based on the geographic data and the associated node data, as described above. The capacity index may include a KPI that is indicative of the ability of the geographic region and/or an associated inbuilding node to support multiple network connections. The ranking platform may determine the capacity index based on KPI derived from the geographic data and/or the node data. In some implementations, the ranking platform may determine the capacity index based on KPI derived from the user equipment data. The capacity index may include a user count observed by an inbuilding node within the geographic region, a user count threshold of an inbuilding node, a trigger event observed by an inbuilding node, a frequency of trigger events observed by an inbuilding node, an average rate of network traffic through an inbuilding node, a download volume via an inbuilding node, and/or another capacity index relating to the geographic region and/or an associated inbuilding node.

As further shown in FIG. 4, process 400 may include determining a regional score for the geographic region based on the coverage index and the capacity index (block 470). For example, the ranking platform (e.g., using a computing resource 245, a processor 320, a memory 330, a storage component 340, and/or the like) may determine a regional score for the geographic region based on the coverage index and the capacity index, as described above. In some implementations, the ranking platform may assign a respective weight to each of the coverage index and the capacity index, determine a weighted coverage index and a weighted capacity index based on the respective weight, and determine the regional score based on the weighted coverage index and the weighted capacity index. In some examples, the respective weight may be adjustable by a user via a client device to be one of coverage-biased, capacity-biased, or balanced.

In some implementations, ranking platform may determine a node score for an inbuilding node based on the coverage index and the capacity index. For example, the ranking platform may assign a respective weight to each of the coverage index and the capacity index, determine a weighted coverage index and a weighted capacity index based on the respective weight, and determine the node score based on the weighted coverage index and the weighted capacity index. In some examples, the respective weight may be adjustable to be one of coverage-biased, capacity-biased, or balanced. In some examples, the ranking platform may assign a respective weight to one or more of a signal strength, a signal-to-noise ratio, or a signal transition type associated with the coverage index, assign a respective weight to one or more of a user count, a user count threshold, or a trigger event associated with the capacity index, determine a weighted coverage index and a weighted capacity index based on the respective weight, and determine the node score based on the weighted coverage index and the weighted capacity index.

As further shown in FIG. 4, process 400 may include generating a recommendation to service the geographic region based on the regional score (block 480). For example, the ranking platform (e.g., using a computing resource 245, a processor 320, a memory 330, a storage component 340, and/or the like) may generate a recommendation to service the geographic region based on the regional score, as described above. In some implementations, the ranking platform may generate a map of the one or more nodes of the network, generate a graphical representation of the geographic region, and overlay the graphical representation on the map. For example, the graphical representation may be indicative of one or more of a location of the geographic region, a need for coverage support of the geographic region, or a need for capacity support of the geographic region. In some implementations, the ranking platform may generate a recommendation in the form of a list of one or more inbuilding nodes of the network. For example, the list may rank the inbuilding nodes based on respective node scores, and indicate a respective need for coverage support and a respective need for capacity support for each of the inbuilding nodes.

As further shown in FIG. 4, process 400 may include performing an action based on the recommendation (block 490). For example, the ranking platform (e.g., using a computing resource 245, a processor 320, a memory 330, a storage component 340, an input component 350, an output component 360, and a communication interface 370, and/or the like) may perform an action based the recommendation, as described above. In some implementations, the ranking platform may transmit the recommendation (e.g., a map ranking geographic regions in need of support and/or a list ranking inbuilding nodes in need of support) to a user via a client device. Additionally, or alternatively, the ranking platform may automatically identify the highest ranked geographic region and/or the highest ranked inbuilding node, and transmit a recommendation to the user to service the identified geographic region and/or the identified inbuilding node.

In some implementations, the ranking platform may receive a query from a user requesting the state of a particular geographic region and/or a particular inbuilding node. Additionally, or alternatively, the ranking platform may identify a coverage gap and/or an opportunity for a new infrastructure build within a geographic area based on the network analytics data. In some implementations, the ranking platform may transmit instructions to enable, disable, or otherwise control network equipment to redirect network traffic in a way to improve coverage and/or alleviate capacity of an inbuilding node. In some examples, the ranking platform may transmit instructions to cause certain network equipment and/or certain components of a network equipment to move or change position in a manner that improves coverage and/or alleviates capacity of an inbuilding node.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from one of a set of network storage devices, geographic data including analytics information relating to a geographic region of a network,
      wherein the geographic data comprises information regarding one or more of an average signal strength or an average user count associated with the geographic region;
   receiving, by the device and from one of the set of network storage devices, user equipment data including analytics information relating to one or more user equipment of the network;
   receiving, by the device and from one of the set of network storage devices, node data including analytics information corresponding to one or more nodes of the network;
   associating, by the device, the user equipment data and the node data with the geographic data based on relative locations of the one or more user equipment, the one or more nodes, and the geographic region;
   identifying, by the device, a coverage index for the geographic region based on the geographic data and the associated user equipment data;
   identifying, by the device, a capacity index for the geographic region based on the geographic data and the associated node data;
   determining, by the device, a regional score for the geographic region based on the coverage index and the capacity index;
   generating, by the device, a recommendation to service the geographic region based on the regional score; and
   performing, by the device, an action based on the recommendation.

2. The method of claim 1, wherein identifying the coverage index comprises:
   determining the coverage index based on one or more of a signal strength, a signal-to-noise ratio, or a signal transition type associated with each of the one or more user equipment.

3. The method of claim 1, wherein identifying the capacity index comprises:
   determining the capacity index based on one or more of a user count, a user count threshold, or a trigger event associated with each of the one or more nodes,
      wherein the trigger event occurs when the user count satisfies the user count threshold.

4. The method of claim 1, further comprising:
   assigning a respective weight to each of the coverage index and the capacity index, wherein the respective weight is adjustable by a user via a client device to be one of coverage-biased, capacity-biased, or balanced; and determining a weighted coverage index and a weighted capacity index based on the respective weight; and wherein determining the regional score comprises:
determining the regional score based on the weighted coverage index and the weighted capacity index.

5. The method of claim 1, wherein generating the recommendation comprises:
generating a map of the one or more nodes;
generating a graphical representation of the geographic region,
wherein the graphical representation is indicative of one or more of a location of the geographic region, a need for coverage support of the geographic region, or a need for capacity support of the geographic region; and
overlaying the graphical representation on the map.

6. A device, comprising:
one or more memories; and
one or more processors, communicatively coupled to the one or more memories, to:
receive, from one of a set of network storage devices, geographic data including analytics information relating to a geographic region of a network,
wherein the geographic data comprises information regarding one or more of an average signal strength or an average user count associated with the geographic region;
receive, from one of the set of network storage devices, user equipment data including analytics information relating to one or more user equipment of the network;
receive, from one of the set of network storage devices, node data including analytics information corresponding to a node of the network;
associate the user equipment data and the node data with the geographic region based on relative locations of the one or more user equipment, the node, and the geographic region;
identify a coverage index for the node based on the geographic data and the associated user equipment data;
identify a capacity index for the node based on the geographic data and the associated node data;
determine a node score for the node based on the coverage index and the capacity index;
generate a recommendation to service the node based on the node score; and
perform an action based on the recommendation.

7. The device of claim 6, wherein the one or more processors, when receiving the user equipment data, are to:
receive one or more of a timestamp, geographical coordinates, a signal strength, a signal-to-noise ratio, or a signal transition type associated with each of the one or more user equipment.

8. The device of claim 6, wherein the one or more processors, when receiving the node data, are to:
receive one or more of a user count or a user count threshold associated with the node.

9. The device of claim 6, wherein the one or more processors, when identifying the coverage index, are to:
identify the coverage index based on one or more of a signal strength, a signal-to-noise ratio, or a signal transition type associated with each of the one or more user equipment.

10. The device of claim 6, wherein the one or more processors, when identifying the capacity index, are to:
identify the capacity index based on one or more of a user count, a user count threshold, or a trigger event associated with the node,
wherein the trigger event occurs when the user count satisfies the user count threshold.

11. The device of claim 3, wherein the one or more processors are further to:
assign a respective weight to each of the coverage index and the capacity index,
wherein the respective weight is adjustable to be one of coverage-biased, capacity-biased, or balanced; and
determine a weighted coverage index and a weighted capacity index based on the respective weight; and
wherein the one or more processors, when determining the node score, are to:
determine the node score based on the weighted coverage index and the weighted capacity index.

12. The device of claim 6, wherein the one or more processors are further to:
assign a first respective weight to one or more of a signal strength, a signal-to-noise ratio, or a signal transition type associated with the coverage index;
assign a second respective weight to one or more of a user count, a user count threshold, or a trigger event associated with the capacity index;
determine a weighted coverage index and a weighted capacity index based on the first respective weight and the second respective weight; and
determine the node score based on the weighted coverage index and the weighted capacity index.

13. The device of claim 6, wherein the one or more processors, when generating the recommendation, are to:
generate a list of the node and one or more additional nodes,
wherein the list ranks the node and the one or more additional nodes based on the node score, and
wherein the list indicates a respective need for coverage support and a respective need for capacity support for each of the node and the one or more additional nodes.

14. A non-transitory computer-readable medium storing instructions, the instructions comprising:
one or more instructions that, when executed by one or more processors, cause the one or more processors to:
receive, from one or more network storage devices, geographic data including data relating to one or more geographic regions of a network,
wherein the geographic data comprises information regarding one or more of an average signal strength or an average user count associated with the geographic region;
receive, from the one or more network storage devices, user equipment data including data relating to one or more user equipment of the network;
receive, from the one or more network storage devices, node data including data corresponding to one or more nodes of the network;
associate the user equipment data and the node data with the geographic data based on relative locations of the one or more user equipment, the one or more nodes, and the one or more geographic regions;
identify a respective coverage index for each of the one or more geographic regions and for each of the one or more nodes based on the geographic data and the associated user equipment data;

identify a respective capacity index for each of the one or more geographic regions and for each of the one or more nodes based on the geographic data and the associated node data;

determine a respective regional score for each of the one or more geographic regions based on the respective coverage index and the respective capacity index;

determine a respective node score for each of the one or more nodes based on the respective coverage index and the respective capacity index; and cause an action to be performed based on the respective regional score for each of the one or more geographic regions and the respective node score for each of the one or more nodes.

15. The non-transitory computer-readable medium of claim 14, wherein the one or more instructions, that cause the one or more processors to receive the user equipment data, cause the one or more processors to:

receive one or more of a timestamp, a geographical coordinate, a signal strength, a signal-to-noise ratio, or a signal transition type associated with each of the one or more user equipment.

16. The non-transitory computer-readable medium of claim 14, wherein the one or more instructions, that cause the one or more processors to identify the respective coverage index, cause the one or more processors to:

identify the respective coverage index based on one or more of a signal strength, a signal-to-noise ratio, or a signal transition type associated with each of the one or more user equipment.

17. The non-transitory computer-readable medium of claim 14, wherein the one or more instructions, that cause the one or more processors to identify the respective capacity index, cause the one or more processors to:

identify the respective capacity index based on one or more of a user count, a user count threshold, or a trigger event associated with each of the one or more nodes, wherein the trigger event occurs when the user count satisfies the user count threshold.

18. The non-transitory computer-readable medium of claim 14, wherein the one or more instructions, that cause the one or more processors to cause the action to be performed, cause the one or more processors to:

generate a map of the one or more nodes;

generate a respective graphical representation for each of the one or more geographic regions, wherein the respective graphical representation is indicative of a respective location, a respective need for coverage support, and a respective need for capacity support for each of the one or more geographic regions;

overlay the graphical representations on the map; and transmit the map to a client device.

19. The non-transitory computer-readable medium of claim 14, wherein the one or more instructions, that cause the one or more processors to cause the action to be performed, cause the one or more processors to:

generate a list of the one or more nodes, wherein the list ranks the one or more nodes based on the respective node score for each of the one or more nodes, and wherein the list indicates a respective need for coverage support and a respective need for capacity support for each of the one or more nodes; and transmit the list to a client device.

20. The method of claim 1, wherein performing the action comprises:

transmitting one or more instructions to enable or disable network equipment associated with the one or more nodes.

* * * * *